(12) United States Patent
Chang et al.

(10) Patent No.: US 8,856,461 B2
(45) Date of Patent: Oct. 7, 2014

(54) REQUEST CONTROLLING

(75) Inventors: Xiao Tao Chang, Beijing (CN);
Hubertus Franke, Cortlandt Manor, NY (US); Xiaolu Mei, Shanghai (CN); Kun Wang, Beijing (CN); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 13/217,398

(22) Filed: Aug. 25, 2011

(65) Prior Publication Data

US 2012/0054451 A1   Mar. 1, 2012

(30) Foreign Application Priority Data

Aug. 31, 2010 (CN) .......................... 2010 1 0271150

(51) Int. Cl.
| G06F 12/00 | (2006.01) |
| G06F 9/38 | (2006.01) |
| G06F 15/167 | (2006.01) |
| G06F 3/00 | (2006.01) |
| G06F 13/00 | (2006.01) |

(52) U.S. Cl.
CPC ............ G06F 15/167 (2013.01); G06F 9/3877 (2013.01); G06F 3/00 (2013.01); G06F 13/00 (2013.01)
USPC .......................................... 711/152; 711/103

(58) Field of Classification Search
CPC ..... G06F 3/0659; G06F 9/3855; G06F 12/00; G06F 12/123
USPC ................................................ 711/103, 152
See application file for complete search history.

(56) References Cited

U.S. PATENT DOCUMENTS 4,949,251 A * 8/1990 Griffin et al. ................... 714/20
6,820,170 B1 11/2004 Elnathan et al.
(Continued)

FOREIGN PATENT DOCUMENTS

| CN | 1627273 A | 6/2005 |
| CN | 1829964 A | 9/2006 |

OTHER PUBLICATIONS

El-Mateh, "Efficient test compression technique based on block merging," IET Comput. Digit Tech., 2008, vol. 2, No. 5, pp. 327-335.

(Continued)

*Primary Examiner* — Aimee Li
*Assistant Examiner* — Christopher Do
(74) *Attorney, Agent, or Firm* — Thomas Grzesik; Fleit Gibbons Gutman Bongini & Bianco PL

(57) ABSTRACT

This invention provides a request controlling apparatus, processor and method. The request controlling apparatus is connected to a request storage unit and includes: a queue unit storing flag recording region configured to record a storing flag corresponding to a queue unit in the request storage unit, a comparing means configured to judge whether a incoming first queue unit corresponds to a same message as an already existing queue unit, where the already existing queue unit is in the request storage unit and a flag setting means is configured to set the storing flag corresponding to the already existing queue unit in the queue unit storing flag recording region, to indicate that a message state related to the already existing queue unit will not be stored if the first queue unit corresponds to the same message as in the already existing queue unit.

5 Claims, 8 Drawing Sheets

(56) References Cited

U.S. PATENT DOCUMENTS

| | | |
|---|---|---|
| 7,551,626 B2 * | 6/2009 | Nemirovsky et al. ...... 370/395.7 |
| 2004/0117801 A1 | 6/2004 | Eibach et al. |
| 2004/0199594 A1 * | 10/2004 | Radatti et al. ................ 709/206 |
| 2006/0274742 A1 | 12/2006 | Pong et al. |
| 2007/0110090 A1 | 5/2007 | Musoll et al. |
| 2008/0183907 A1 | 7/2008 | Thudt et al. |
| 2008/0189252 A1 | 8/2008 | Branscome et al. |
| 2009/0254516 A1 | 10/2009 | Meiyyappan et al. |
| 2010/0013678 A1 | 1/2010 | Biran et al. |
| 2010/0020825 A1 | 1/2010 | Bass et al. |
| 2011/0055522 A1 * | 3/2011 | Chang et al. .................. 712/203 |

OTHER PUBLICATIONS

Yu et al., "Stateful Hardware Decompression in Networking Environment," ANCS: Nov. 2008, 141-150.

* cited by examiner

REQUEST CONTROLLING

CROSS-REFERENCE TO RELATED APPLICATION

This application claims priority under 35 U.S.C. §119 from Chinese Patent Application No. 201010271150.8 filed on Aug. 31, 2010, the entire contents of which are incorporated herein by reference.

BACKGROUND OF THE INVENTION

1. Field of the Invention

This invention relates to data processing field, and more particularly, to a request controlling apparatus, a request controlling method and relevant processor.

2. Related Art

A common multiple processor cooperative architecture is that the multiple processors are of different types. For example, a general processor is used as the main processor, and multiple dedicated processors corresponding to the general processor are used as co-processors. The dedicated processors have been particularly optimized for some special applications, such that they have higher performance than the general processor while processing the special applications. The applications can be, for example, encryption/decryption, compression/decompression, encoding/decoding, pattern matching or XML parsing.

FIG. 1 shows a diagram of such architecture. The general processor sends data to be processed to a dedicated processor via a request storage unit, and the dedicated processor sends the processing results to the general processor via a result storage unit.

Generally, the request storage unit and the result storage unit are disposed inside the chip of the dedicated processor, and typically the capacity of the request storage unit and the result storage unit will be relatively small due to limitation in chip area. For example, a typical request storage unit can only hold 8 or 16 requests. To solve this problem, a storage region can be set up in an external storage, so as to expand the request storage unit and the result storage unit inside the chip. For simplicity, a portion of the request storage unit located in the chip is referred to as a primary request storage region, and an extended portion of the request storage unit located in external storage is referred to as a secondary request storage region.

Both the primary request storage region and the secondary request storage region are part of the request storage unit. Similarly, a portion of the result storage unit located in the chip is referred to as a primary result storage region, and an extended portion of the result storage unit located in external storage is referred to as a secondary result storage region. Both the primary result storage region and the secondary result storage region are part of the result storage unit.

The working principle of the secondary request storage region will be illustratively described below, and those skilled in the art can readily deduce the operation manner of the secondary result storage region. Further, those skilled in the art can also appreciate that, the so-called external storage herein refers to a storage other than the storage units in a chip, for example, cache, memory, hard disk etc. Those skilled in the art can devise many approaches to decide the kind of the external storage in which the secondary request storage region will be set up.

The secondary request storage region is a piece of storage region in the external storage, and a request storage unit accessing means in the chip can record the first address of the secondary request storage region. The request storage unit accessing means can be a part of a request controlling apparatus in the chip. In case that the primary request storage region in the chip is in full state, if a new request is received, the request storage unit accessing means will send that new request to the secondary request storage region in the external storage, and record the location of that new request in the secondary request storage region, i.e. the offset relative to the first address of secondary request storage region.

Of course, the request storage unit accessing means can also record the location of that request in the external storage in other manners, and it is not limited to such manner that the first address of the secondary request storage region is added to the offset of the request relative to the first address of secondary request storage region as described herein. When the primary request storage region is not in full state, the request storage unit accessing means can read out the request in the secondary request storage region and place it into the primary request storage region.

The above method solves the problem that the capacity of the request storage unit, or the result storage unit, in the chip is too small. However, there is still a need of further improving the request storage unit accessing means and the secondary result storage region managing means so as to adapt to the requirement of complicated scenarios in real application.

SUMMARY OF THE INVENTION

One aspect of the invention is a request controlling apparatus connected to a request storage unit that includes a primary request storage region and a secondary request storage region, the request controlling apparatus including: a queue unit storing flag recording region configured to record a storing flag corresponding to a queue unit in the request storage unit, a comparing means configured to judge whether a incoming first queue unit corresponds to a same message as an already existing queue unit, where the already existing queue unit is in the request storage unit, and a flag setting means configured to set the storing flag corresponding to the already existing queue unit in the queue unit storing flag recording region, to thereby indicate that a message state related to the already existing queue unit will not be stored, if the first queue unit corresponds to the same message as in the already existing queue unit.

Another aspect of the invention is a processor connected to the above request storage unit, where the processor includes: a flag reading means configured to determine whether a message state related to a queue unit will be stored after a queue unit has been processed based on a storing flag corresponding to the queue unit and recorded in a queue unit storing flag recording region.

Yet another aspect of the invention is a computer implemented request controlling method for controlling a request storage unit comprising a primary request storage region and a secondary request storage region, method comprising the steps of: recording, in a queue unit storing flag recording region, a storing flag corresponding to a queue unit in the request storage unit, judging whether a incoming first queue unit corresponds to a same message as a an already existing queue unit in the request storage unit, setting the storing flag corresponding to the already existing queue in the queue unit storing flag recording region, to thereby indicate that a message state related to the already existing queue will not be stored, if the first queue unit corresponds to a same message as the already existing queue unit, and where one step is carried out using a computer device.

DETAILED DESCRIPTION OF THE PREFERRED EMBODIMENTS

Figure 1:
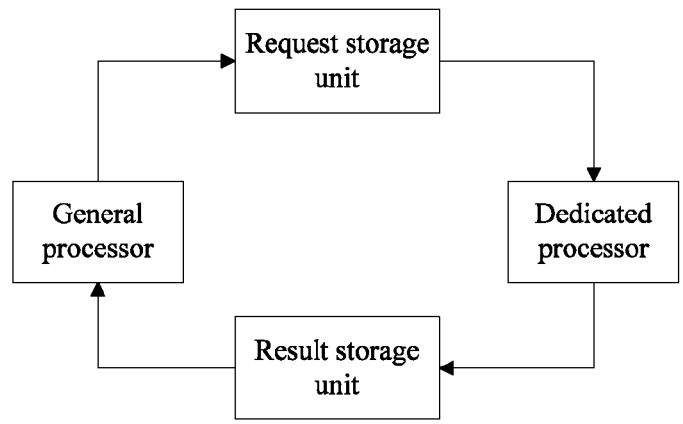
FIG. 1 illustrates a typical multiple processor operative architecture.

According to the technical solution of the invention, access to external storage that is caused by unnecessary storage/load of state and access to external storage that is required when storing flag of queue unit is set can be reduced, thereby improving process speed of the processor. Further, according to some embodiments of the invention, access to external storage that is required when judging whether two queue units correspond to a same message can also be reduced.

The detailed implementation of a processor and a method for scheduling the processor provided by the invention will be described below with reference to the accompanying drawings. In the following description, many specific details are set forth so as to thoroughly understand the invention. However, those skilled in the art will understand that, the invention can be implemented without some of these details, and the invention is not limited to the presented specific embodiments. Instead, the invention can be implemented with any combination of the following features and elements, regardless whether they relate to different embodiments. Thus, the following aspects, features, embodiments and benefits are illustrative only, and should not be regarded as elements or definitions of appended claims, unless otherwise specified. It should also be noted that, only means structure and/or process steps that are closely related to the solution of invention are shown in the drawings, and other details that, substantially do not relate to the invention, are omitted in order to avoid obscuring the invention with unnecessary details. Further, the connection in this application includes both direct connection and indirect connection unless "direct" or "indirect" are intentionally used.

In a network environment, an original message is packed into a plurality of data packets at the sender side, and each data packet includes an original message segment; these data packets are then sent to a receiver side via the network, and the original message segments included in these data packets are assembled by the receiver side so as to recover the original message.

Figure 2:
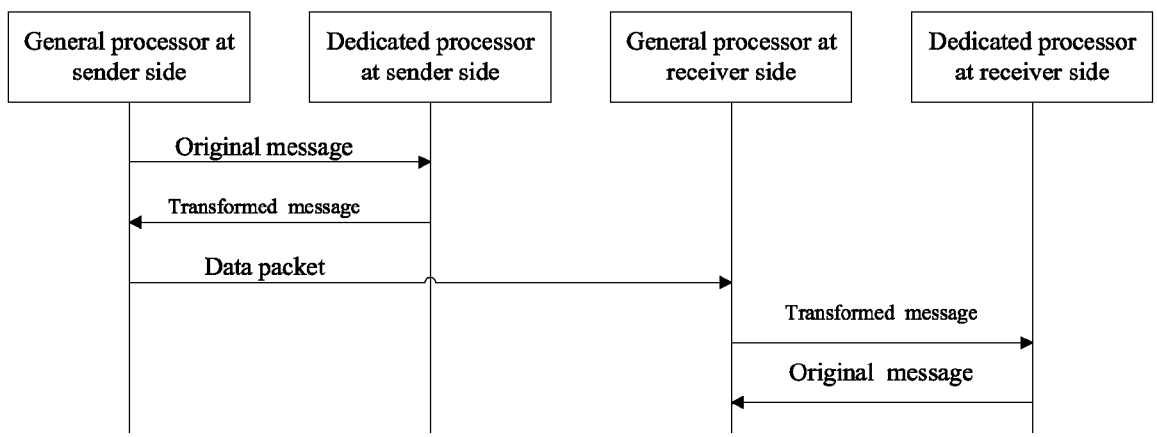
FIG. 2 illustrates a message sending-receiving flow that incorporates pre-processing.

FIG. 2 shows a common message sending-receiving flow that incorporates pre-processing. The flow shown in FIG. 2 is for a case requiring symmetric process at the sender and receiver sides. As shown in FIG. 2, a general processor at the sender side can preprocess (such as compression or encryption) an original message using a dedicated processor at the sender side to form a transformed message, and then the transformed message is divided into a plurality of transformed message segments and packed into a plurality of data packets. Here, the original message and the transformed message are two forms of a same message.

Due to the unstableness of the network environment, the receiver side cannot receive the plurality of data packets successively, although a sender side sends the plurality of data packets successively.

According to an implementation referred to as stateless processing, the general processor at the receiver side can obtain the complete transformed message after all data packets corresponding to a piece of message are received and unpacked, after which an inverse processing is performed on the transformed message using a dedicated processor at the receiver side, thereby recovering the original message.

According to an implementation referred to as stateful processing, the general processor at the receiver side can send the transformed message segment included in a data packet to the dedicated processor at the receiver side, and obtain an original message segment each time the data packet is received and unpacked. Then, it can assemble respective original message segments after all data packets corresponding to a piece of message are received, unpacked and inverse processed, thereby recovering the original message.

At the receiver side, data packets corresponding to different messages can arrive at the receiver side interleaved with each other. In stateful processing, the general processor at the receiver side unpacks each message packet, packs the resulting transformed message segments into queue units according to a certain format, and places them into the primary request storage region of the dedicated processor. The primary request storage region is a part of the request storage unit. The dedicated processor needs to store and load message states frequently when processing queue units.

Figure 3:
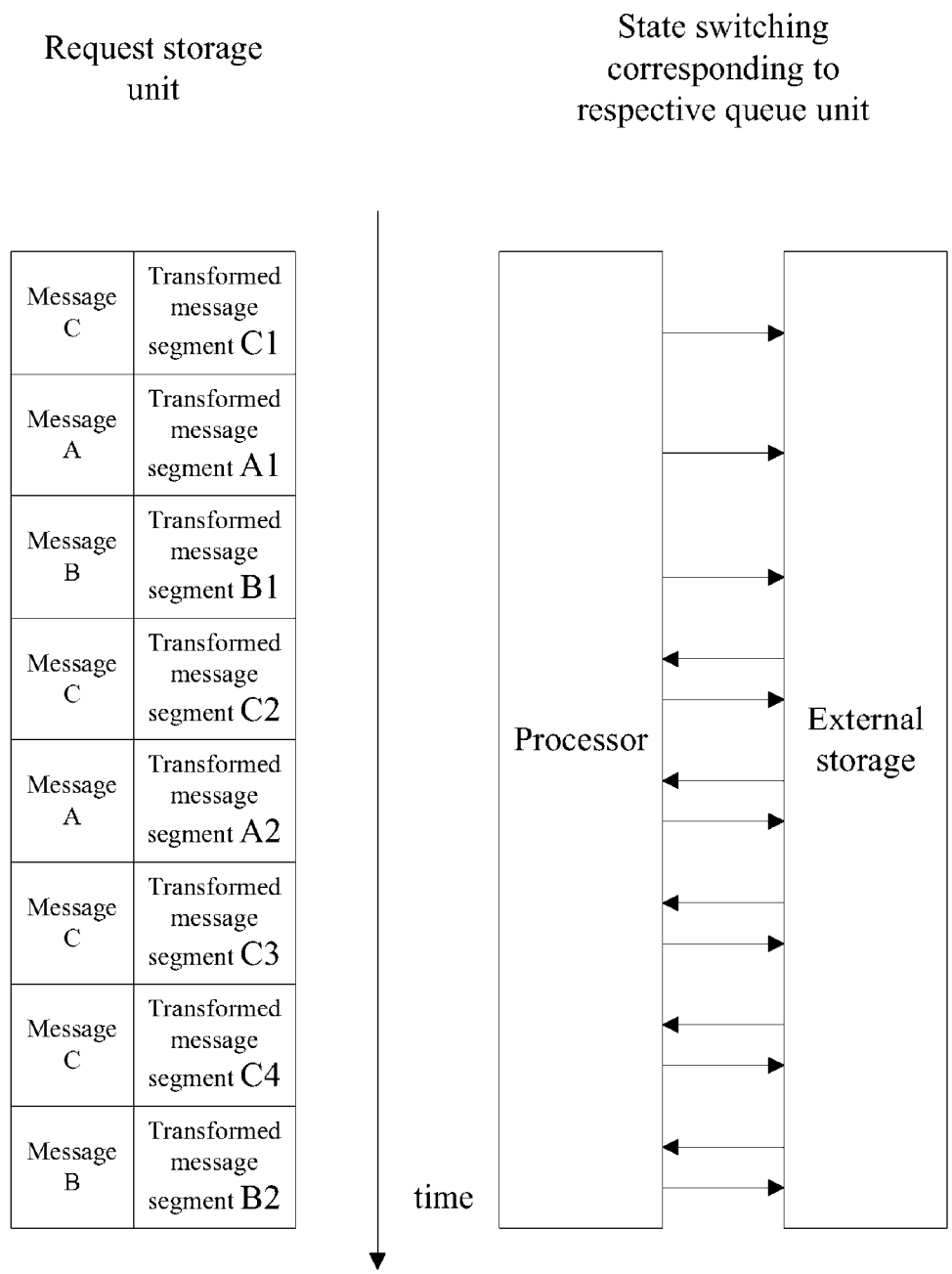
FIG. 3 is a diagram of a request storage unit of a dedicated processor and corresponding message state switching.

FIG. 3 shows an example of the primary request storage region of the dedicated processor and the corresponding message state switching. As shown in the left of FIG. 3, each line represents a queue unit, which at least includes two parts, one is a message ID, and the other is data to be processed or a pointer to the data. Each queue unit in the primary request storage region packs, therein, transformed message segments corresponding to three pieces of message, i.e. transformed message segments of message A, transformed message segments of message B, and transformed message segments of message C.

As shown in the right of FIG. 3, after the queue unit packing of transformed message segment C1 of message C is processed, the message state related to message C needs to be stored. When the queue unit packing of transformed message segment C2 of message C is ready to be processed, a message state related to message C also needs to be loaded.

It is a problem that the dedicated processor does not know whether the two queue units correspond to a same message; thus as shown in FIG. 3, the message state corresponding to a queue unit needs to be stored each time when that queue unit has been processed, and the message state needs to be loaded each time a queue unit is ready to be processed, even though the message state has not been stored before. As such, frequent storage and loading of message states will result in frequent access to external storage, thereby significantly increasing process delay.

Alternatively, it is possible to judge whether a first incoming queue unit corresponds to a same message as a queue unit already existing in the request storage unit. If the first incoming queue unit corresponds to a same message as a queue unit already existing in the request storage unit, a storing flag corresponding to the queue unit already existing in the request storage unit can be set to indicate that a message state related to that queue unit will not be stored. As such, there is no need for the processor to store the message state after processing the queue unit already existing in the request storage unit, thereby reducing access to the external storage.

In the following description, judging whether queue unit A corresponds to a same message as queue unit B can be performed by directly judging whether a message corresponding to queue unit A is the same as a message corresponding to queue unit B. If it is judged that queue unit C corresponds to a same message as queue unit B, then judging whether queue unit A corresponds to a same message as queue unit B can be performed by judging whether a message corresponding to queue unit A is the same as a message corresponding to queue unit C.

Figure 4A:
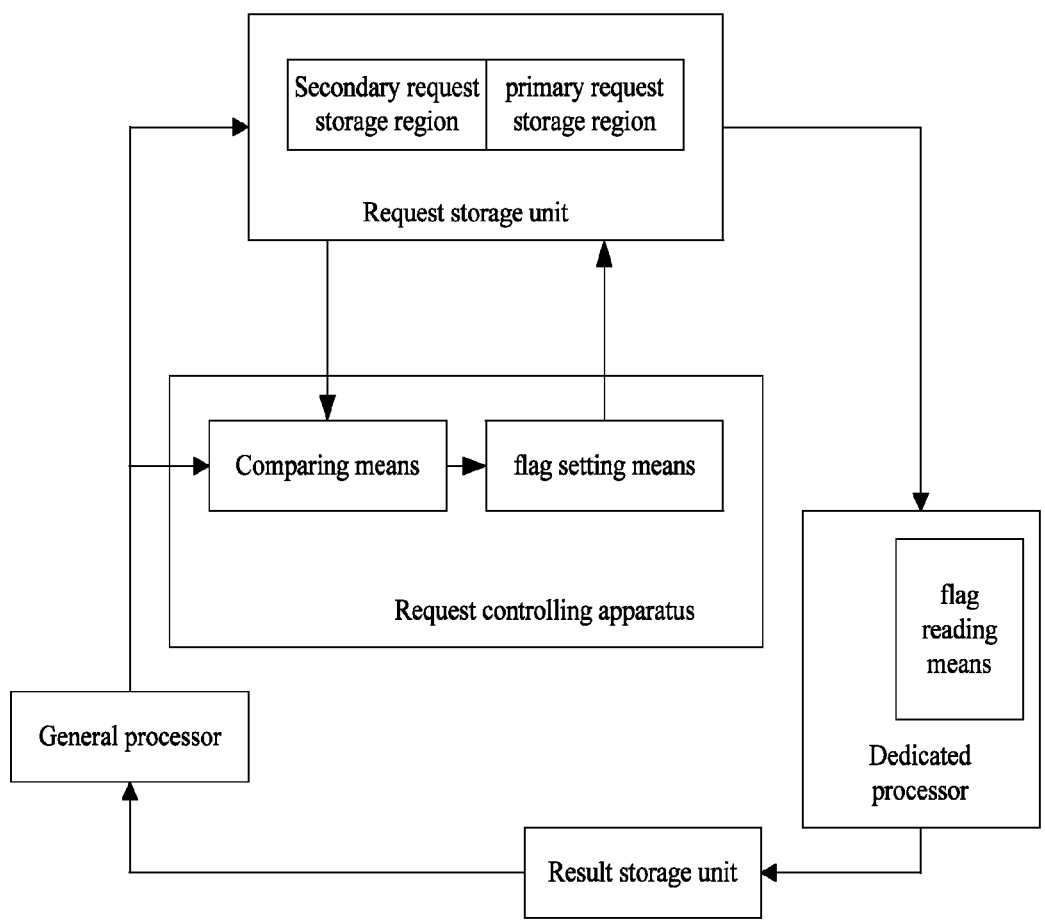
FIG. 4A illustrates a multiple processor cooperative architecture according to an embodiment of the invention.

FIG. 4A shows a multiple processor cooperative architecture according to an embodiment of the invention. As described above with reference to FIG. 3, the dedicated processor does not know whether the two queue units correspond to a same message; thus the message state corresponding to a queue unit needs to be stored each time when that queue unit has been processed. The message state needs to be loaded each time a queue unit is ready to be processed, but the message state has not been stored before. However, according to the architecture shown in FIG. 4, the dedicated processor can be notified of whether the two queue units correspond to a same message.

As shown in FIG. 4A, the general processor and the dedicated processor communicate via the request storage unit and the result storage unit. As described above, the request storage unit includes the primary request storage region located in the chip and the secondary request storage region located in the external storage. The result storage unit includes the primary result storage region located in the chip and the secondary result storage region located in the external storage.

If the general processor and the dedicated processor lie on different chips, the primary request storage region or the primary result storage region can either be set on a same chip as the general processor, or be set on a same chip as the dedicated processor.

In case that the general processor and the dedicated processor are different units of a same chip, the primary request storage region or the primary result storage region is just a special unit on the chip.

Comparing means and flag setting means are part of the request controlling apparatus, and are preferably set in a same location as the primary request storage region. The request controlling apparatus further comprises a request storage unit accessing means (not shown) for writing a queue unit into the request storage unit and reading a previously written queue unit from the request storage unit.

Data structure of the queue unit of the secondary request storage region can, but does not have to be, the same as that of the queue unit of the primary request storage region. For simplicity, the following description is mainly for the case that the data structure of the queue unit of the secondary request storage region is the same as that of the queue unit of the primary request storage region.

Comparing means shown in FIG. 4A is configured to judge whether a first incoming queue unit corresponds to a same message as a second queue unit previously entered in the request storage unit. Those skilled in the art can appreciate that, the second queue unit previously entered the request storage unit lies at the end of the request storage unit queue. If it is judged that the first queue unit corresponds to a same message as the second queue unit, then the flag setting means sets a storing flag in the data structure of the second queue unit based on the judging result. As such, when the dedicated processor processes the second queue unit, it can know the first queue unit that will be processed subsequently corresponds to a same message by reading the storing flag through the flag reading means, so that there is no need to save the message state.

Data structure of the queue unit according to the embodiment includes a message ID for indicating the message that the queue unit corresponds to. The comparing means can determine whether two queue units correspond to a same message by comparing message IDs in these two queue units. The Data structure of the queue unit further includes the storing flag for indicating whether a message state needs to be stored by the dedicated processor after the current queue unit is processed.

The default value of the storing flag can be set to indicate that the message state needs to be stored, so that the flag setting means will set the value of the storing flag to indicate that the message state needs not to be stored only if the comparing means determines that the first queue unit and the second queue unit correspond to a same message. Other content included in the data structure of queue unit are common knowledge in the art and will be omitted for brevity.

The judging operation and flag setting operation can be performed in parallel with the operation in which the first queue unit enters the primary request storage region or the secondary request storage region. How a new queue unit is placed into the primary request storage region in the chip or the secondary request storage region in the external storage is common knowledge in the art, and will be omitted for brevity.

The comparing means and the flag setting means can be implemented by a simple combined circuit, such that not only the process speed can be improved but also the complexity of the processing can be reduced. For example, the comparing means can be implemented by an exclusive-or circuit: it will output 1 if two message IDs are the same, otherwise, it will output 0; assuming the default value of the storing flag is 0, indicating that the relevant message state needs to be stored, then the flag setting means only needs to write the output of the comparing means into the storing flag of the second queue unit.

Figure 4B:
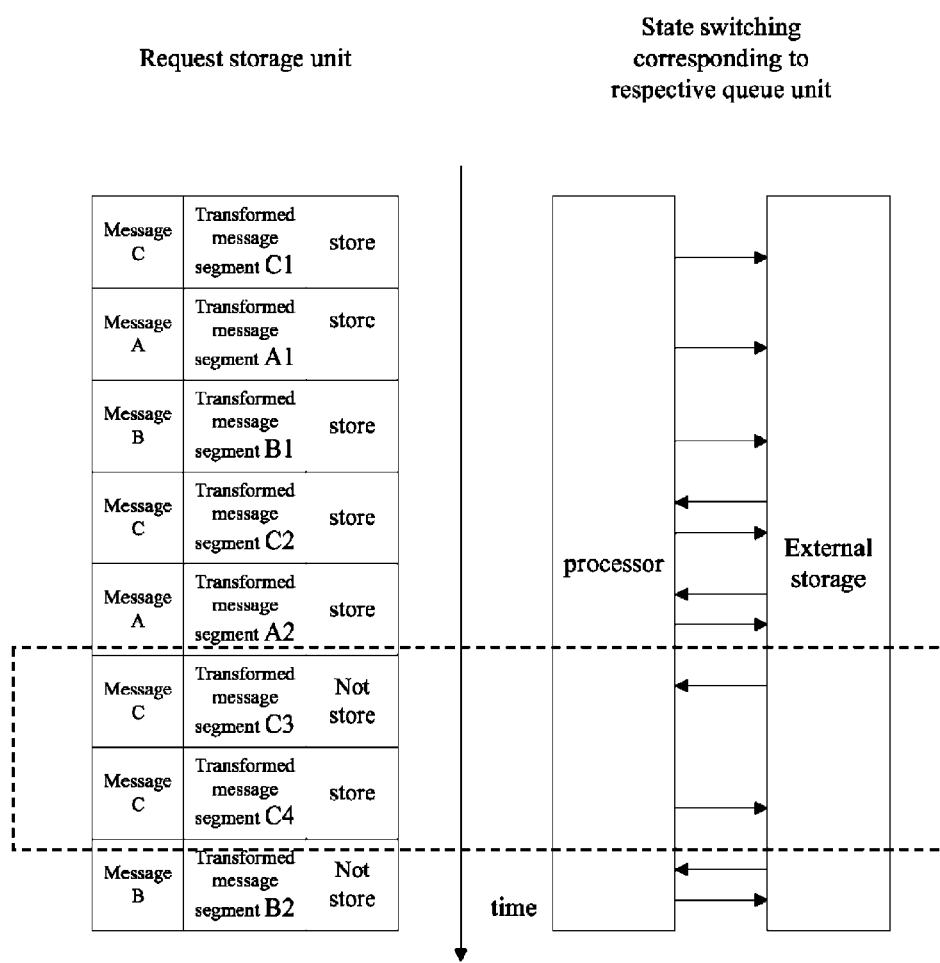
FIG. 4B is diagram of a request storage unit of a dedicated processor and corresponding message state switching corresponding to the embodiment of FIG. 4A.

FIG. 4B is a diagram of the primary request storage region of the dedicated processor and the corresponding message state switching according to the embodiment of FIG. 4A.

Those skilled in the art can appreciate that, the case shown in FIG. 4B is a case that the processor is processing queue units, rather than the case a queue unit is coming. In the left of FIG. 4B, similarly, each line represents one queue unit, each queue unit at least comprises three portions, in which the first portion is message ID, the second portion is data to be processed or a pointer to the data and the third portion is the storing flag. Attention should be paid to the portion surrounded by dashed line. When the queue unit packing of transformed message segment C4 of message C enters the request storage unit, as described above, the flag setting means sets the storing flag of the queue unit packing transformed message segment C3 of message C to indicate that a message state will not be stored.

Although in FIG. 4B, the queue unit packing of the transformed message segment C3 of message C and the queue unit packing of transformed message segment C4 of message C lie at the middle of the queue rather than the end of the queue, those skilled in the art can appreciate that, the queue unit packing of transformed message segment C3 of message C will lie at the end of the queue when the queue unit packing transformed message segment C4 of message C is coming.

The dedicated processor does not need to access the external storage for storing a message state after the queue unit packing of transformed message segment C3 of message C is processed; also, the dedicated processor does not need to access the external storage for loading the message state after the queue unit packing of transformed message segment C4 of message C is processed.

If the second queue unit lies in the secondary request storage region set up in the external storage, although access to the external storage required to store the message state can be reduced according to the above method, access to external storage will be increased when it is judged whether the first queue unit and the second queue unit correspond to a same message. Also, access to external storage will be increased when the storing flag of the second queue unit is modified.

In particular, when the first queue unit comes, the request storage unit accessing means needs to read the second queue unit located at the end of the queue from the secondary request storage region in the external storage, so that the comparing means can compare whether the second queue unit corresponds to a same message as the first queue unit. After the storing flag of the second queue unit is set to indicate that the message state is not stored, the request storage unit accessing means further needs to write the second queue unit back to the secondary request storage region in the external storage, which further increases the times of access to external storage.

Figure 5:
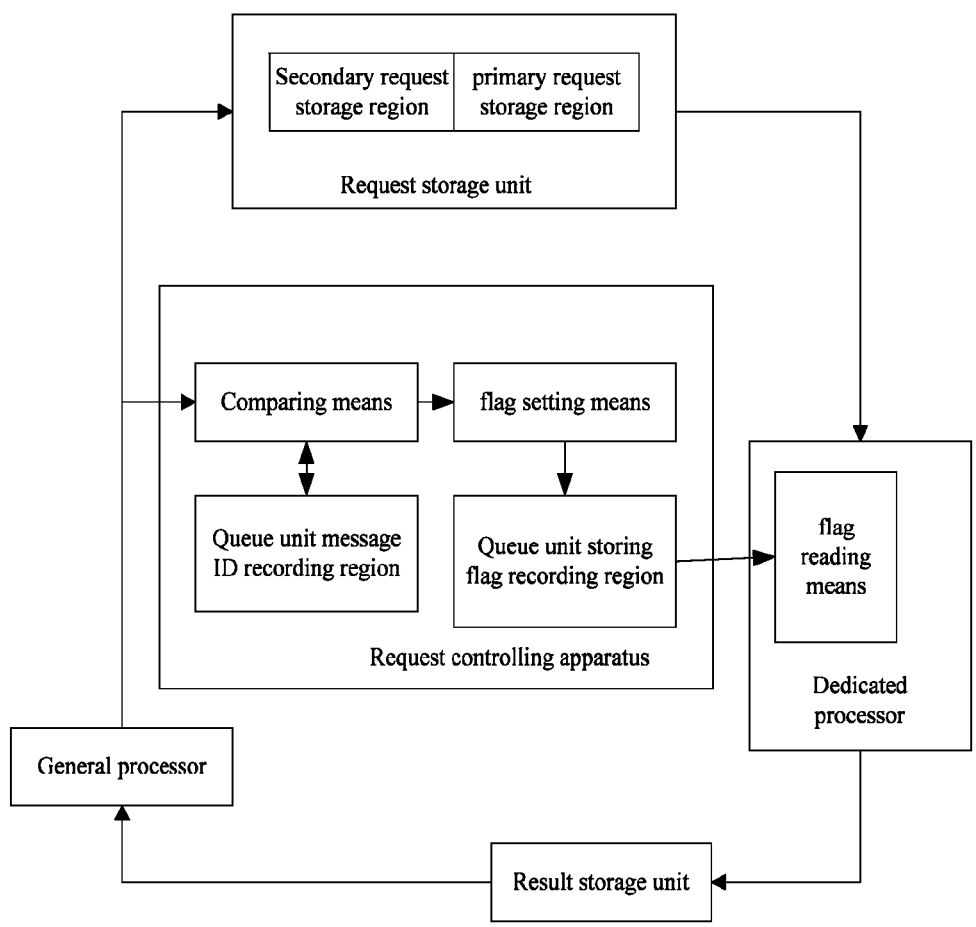
FIG. 5 shows a multiple processor cooperative architecture according to another embodiment of the invention.

FIG. 5 shows a multiple processor cooperative architecture according to another embodiment of the invention.

In the architecture shown in FIG. 5, in contrast to the architecture shown in FIG. 4A, the request controlling apparatus comprises a queue unit storing flag recording region, and optionally further comprises a queue unit message ID recording region such that the times of access to external storage can be reduced. Where, the queue unit message ID recording region records the message ID corresponding to the second queue unit that lies at queue end of the request storage unit, and the queue unit storing flag recording region records the following for a queue unit that already existed in the request storage unit: whether the message state corresponding to that queue unit needs to be stored after that queue unit is processed.

As described above, in the architecture shown in FIG. 4A, if the second queue unit that lies at the queue end of the request storage unit is in the secondary request storage region, the added access to the external storage mainly comes from two aspects: reading the second queue unit from the external storage, and writing the second queue unit having modified storing flag back into the external storage if the second queue unit and the first queue unit correspond to a same message.

As for the first aspect, in the structure shown in FIG. 5, since there is a queue unit message ID recording region, the comparing means can judge whether the first queue unit and the second queue unit that lies at the queue end of the request storage unit correspond to a same message by only judging whether message ID of first queue unit is the same as the message ID recorded in the queue unit message ID recording region. There is no need to read the second queue unit from the external storage.

In particular, the comparing means compares the message ID of the first queue unit with the message ID stored in the queue unit message ID recording region when the first queue unit comes. At this moment, what is recorded in the queue unit message ID recording region is the message ID of the second queue unit. After comparison, the comparing means outputs the comparing result to the flag setting means, and writes the message ID of the coming first queue unit into the queue unit message ID recording region.

It can be seen from connection relationship of the comparing means in FIG. 4A and the comparing means in FIG. 5 that, in FIG. 4A, the comparing means needs to access the request storage unit; in FIG. 5, however, the comparing means does not need to access the request storage unit, it only needs to access the queue unit message ID recording region.

Those skilled in the art can appreciate that, the so-called access to the request storage unit is made via the request storage unit accessing means.

As for the second aspect, and in the structure shown in FIG. 5, there is a queue unit storing flag recording region. Accordingly, data structure of the queue unit can omit the data field of the storing flag. It can be seen from the connection relationship of the flag setting means of FIG. 4A and that of FIG. 5 that, in FIG. 4A, the flag setting means needs to access the request storage unit. However, in FIG. 5, the flag setting means does not need to access the request storage unit, and only needs to access the queue unit storing flag recording region.

Accordingly, the flag reading means in the dedicated processor can read storing flag corresponding to a certain queue unit from the queue unit storing flag recording region, so as to determine whether the message state related to message corresponding to the queue unit needs to be stored after the queue unit is processed.

Those skilled in the art can appreciate that, the number of bits of the queue unit message ID recording region can generally be identical to that of the queue unit message ID.

As described above, the storing flag of each queue unit can actually be realized by one bit, thus the number of bits of the queue unit storing flag recording region can generally be identical with the number of the queue units that can be housed in the secondary request storage region. This corresponds to a case that the queue unit storing flag recording region only records the queue units that can be housed in the secondary request storage region. In this case, the data structure of the queue unit in the primary request storage region needs to further comprise the storing flag.

The queue unit storing flag recording region can also record the queue units that can be housed in the primary request storage region and the secondary request storage region. In this case, the queue units in the primary request storage region and the queue units in the secondary request storage region both will not comprise the storing flag. In this case, the number of bits of the queue unit storing flag recording region can generally be identical with a sum of the number of the queue units that can be housed in the secondary request storage region and the number of the queue units that can be housed in the primary request storage region.

In the following description, for simplicity, assume that the data structure of the queue units in the primary request storage region and the queue units in the secondary request storage region both do not comprise the storing flag, that is, the queue unit storing flag recording region can record the queue units that can be housed in the primary request storage region and the secondary request storage region.

Further, in case that the resource in the chip is limited, the number of times of access to the external storage can be reduced even if only one of the queue unit message ID recording region and the queue unit storing flag recording region is set.

Figure 6A:
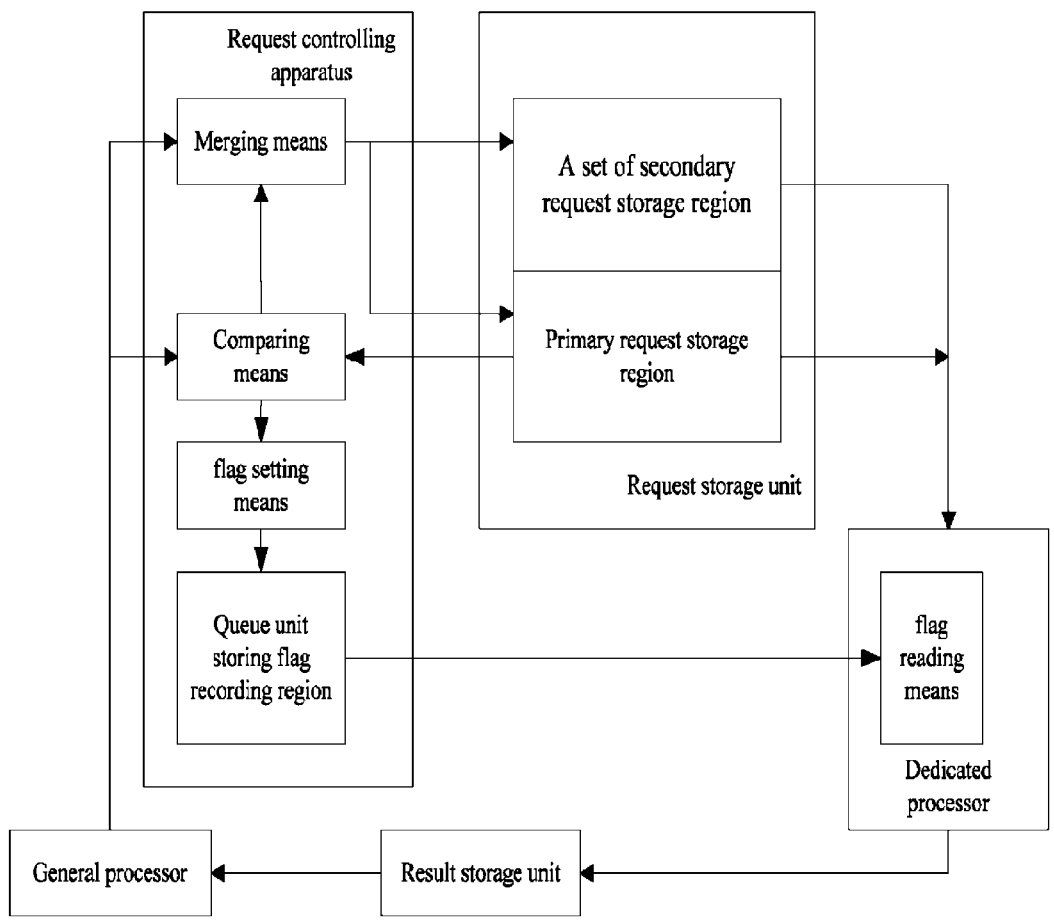
FIG. 6A shows a multiple processor cooperative architecture according to yet another embodiment of the invention.

FIG. 6A shows a multiple processor cooperative architecture according to another embodiment of the invention.

According to this embodiment, a set of secondary request storage regions can be set, which comprises more than two secondary request storage regions. In this embodiment, the number of the secondary request storage region is equal to the total number of the queue units that can be housed in the primary request storage region concurrently, i.e. equal to the total number of the elementary hardware storage unit of the primary request storage region. As such, a corresponding secondary request storage region is set for a queue unit in the primary request storage region, after a queue unit in the primary request storage region is processed.

A plurality of queue units that lie in the secondary request storage region and correspond to a same message as that the queue unit can be processed successively, such that access to external storage for storing the message state can be further reduced.

Those skilled in the art can appreciate that, the number of the secondary request storage regions can also be smaller than the total number of the elementary hardware storage units of the primary request storage region. That is, the secondary request storage region can be set for some elementary hardware storage units only. In this case, the elementary hardware storage units discussed below are only for the elementary hardware storage unit for which the secondary request storage region is set.

In the embodiment shown in FIG. 6, the dedicated secondary request storage region is set for each of the elementary hardware storage units in the primary request storage region. One secondary request storage region corresponds to or is dedicated to one elementary hardware storage unit in the primary request storage region, which represents that the secondary request storage region is dedicated to store such queue units that correspond to a same message as the queue unit stored in elementary hardware storage units in the primary request storage region.

In the following description, one queue unit for which the secondary request storage region is set or which corresponds to the secondary request storage region refers to that elementary hardware storage unit where that queue unit lies and is set with the secondary request storage region or corresponds to the secondary request storage region.

The comparing means judges whether a first incoming queue unit corresponds to a same message as an already existing queue unit in the primary request storage region. If the comparing means judges that the first incoming queue unit corresponds to the same message as the queue unit (referred to as a third queue unit) already existing in the primary request storage region, then the merging means places the first queue unit into the secondary request storage region corresponding to the third queue unit.

For judging whether the first queue unit corresponds to the same message as the third queue unit, the message ID in the data structure of the first queue unit can be directly compared with the message ID in the data structure of the third queue unit. It can be readily appreciated that, since the third queue unit lies in the primary request storage region in the chip, it only needs to be compared with the queue unit in the primary request storage region, and there is no need to access the external storage.

Accordingly, in the architecture shown in FIG. 6A, the queue unit message ID recording region is omitted relative to the architecture shown in FIG. 5A.

If the first queue unit is the first one queue unit that enters the secondary request storage region corresponding to the third queue unit, that is, the secondary request storage region corresponding to the third queue unit is empty when the first queue unit comes, then the flag setting means sets the storing flag corresponding to the third queue unit.

Since it is assumed before that both data structure of queue units in the primary request storage region and data structure of queue units in the secondary request storage region do not comprise a storing flag, that is, the queue unit storing flag recording region record both queue units that can be housed in the primary request storage region and the secondary request storage region, the operation of the flag setting means setting the storing flag corresponding to the third queue unit actually sets the storing flag corresponding to the third queue unit in the queue unit storing flag recording region.

Those skilled in the art can appreciate that, since the third queue unit lies in the primary request storage region, the number of times of access to the external storage will not be increased even if the storing flag is stored in the data structure of the third queue unit. Thus, the operation of the flag setting means setting the storing flag corresponding to the third queue unit can be setting the storing flag included in the data structure of the third queue unit.

If the first queue unit is not a first queue unit that enters the secondary request storage region corresponding to the third queue unit, that is, the secondary request storage region corresponding to the third queue unit is not empty when the first queue unit comes, then the flag setting means sets a storing flag that enters the secondary request storage region corresponding to the third queue unit before the first queue unit. The queue unit that enters the secondary request storage region corresponding to the third queue unit before the first queue unit is referred to as the fourth queue unit hereafter.

Since the fourth queue unit lies in the external storage, the flag setting means preferably sets the storing flag corresponding to the fourth queue unit in the queue unit storing flag recording region.

Figure 6B:
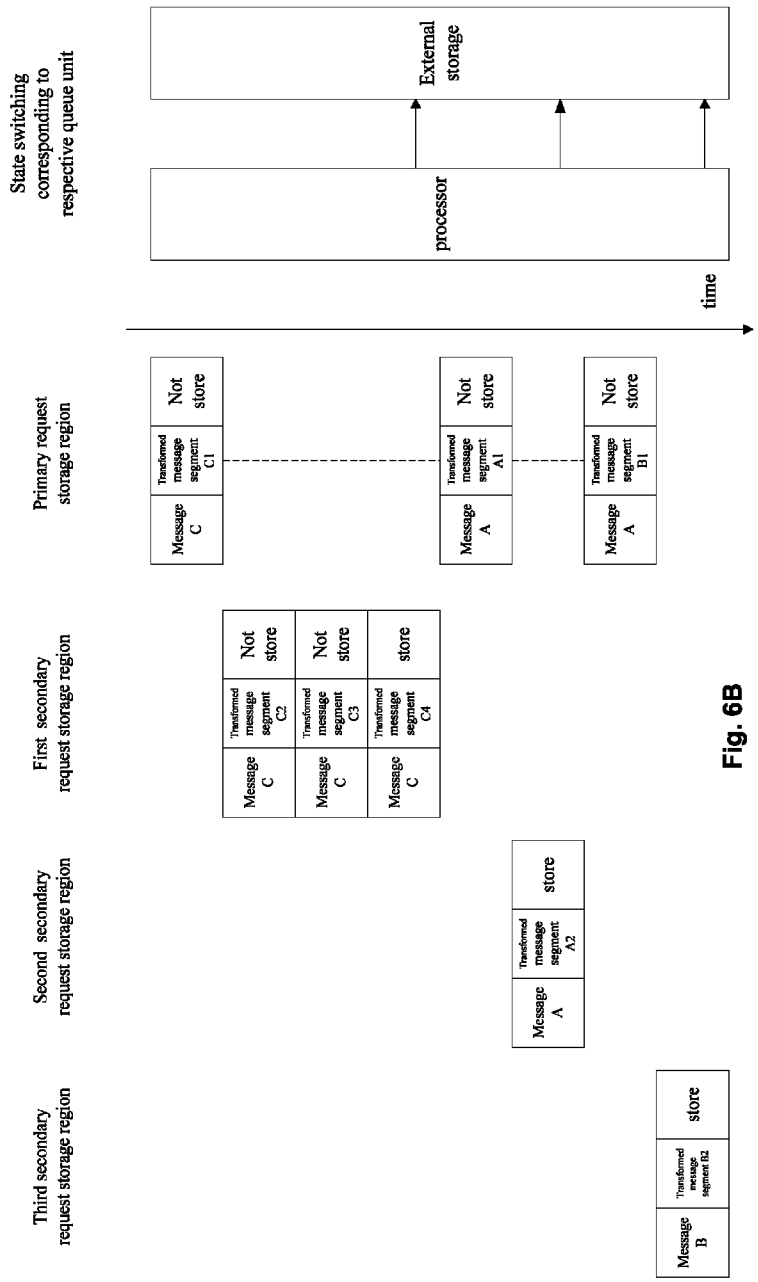
FIG. 6B is a diagram of a request storage unit of a dedicated processor and corresponding message state switching corresponding to the embodiment of FIG. 6A.

FIG. 6B shows the primary request storage region, the secondary request storage region of the dedicated processor, and the corresponding message state switching in case that one secondary request storage region is set for each queue unit in the primary request storage region. Where, the dashed line represents that two connected queue units are adjacent physically, but are separated as to process time.

Those skilled in the art can appreciate that the case shown in FIG. 6 is a case that the processor is processing the queue unit rather than the queue unit is coming. For simplicity, FIG. 6B shows that the queue unit of the secondary request storage region has a same data structure as a queue unit of the primary request storage region.

Note that, in FIG. 6B, the storing flags of respective queue units are shown in line with data structure of the queue units for the purpose of clearly illustrating whether the message state will be stored after the respective queue unit is processed.

As described above, the queue unit storing flag recording region records both queue units that can be housed in the primary request storage region and the secondary request storage region. Thus, for the queue units in the first secondary request storage region, the second secondary request storage region, the third secondary request storage region and the primary request storage region, the storing flags are actually all recorded by the queue unit storing flag recording region.

The primary request storage region and the secondary request storage region shown in FIG. 6B are formed as follows. The order of issuing queue units by the general processor is the same as that of FIG. 3, FIG. 4B and FIG. 5B, thus, the queue unit packing transformed message segment C1 of message C, the queue unit packing transformed message segment A1 of message A, the queue unit packing transformed message segment B1 of message B enter the queue unit sequentially.

When the queue unit packing transformed message segment C2 of message C comes, according to the embodiment of the invention, the merging means places it into the first secondary request storage region, i.e. the secondary request storage region corresponding to the queue unit packing transformed message segment C1 of message C, and the flag setting means sets the storing flag of queue unit packing transformed message segment C1 of message C to indicate that the message state will not be stored.

When the queue unit packing transformed message segment A2 of message A comes, according to the embodiment of the invention, the merging means places it into the second secondary request storage region, i.e. the secondary request storage region corresponding to the queue unit packing transformed message segment A1 of message A, and the flag setting means sets the storing flag of queue unit packing transformed message segment A1 of message A to indicate that the message state will not be stored.

When the queue unit packing transformed message segment C3 of message C, the queue unit packing transformed message segment C4 of message C comes sequentially, according to the embodiment of the invention, the merging means places them into the first secondary request storage region, and sets related storing flags accordingly.

When the queue unit packing transformed message segment B2 of message B comes, according to the embodiment of the invention, the merging means places it into the third secondary request storage region, i.e. the secondary request storage region corresponding to the queue unit packing transformed message segment B1 of message B.

It can be seen from comparing FIG. 6B and FIG. 4B that, the number of storing/loading message state is further reduced. Meanwhile, since the first incoming queue unit needs only to be compared with the queue unit in the primary request storage region, additional access to the external storage will not be increased when it is judged whether two queue units correspond to a same message. Also, since the queue unit storing flag recording region is set in the chip to record whether the message state needs to be stored after the respective queue unit is processed, additional access to the external storage also will not be increased when the storing flag of queue unit is modified.

Figure 7:
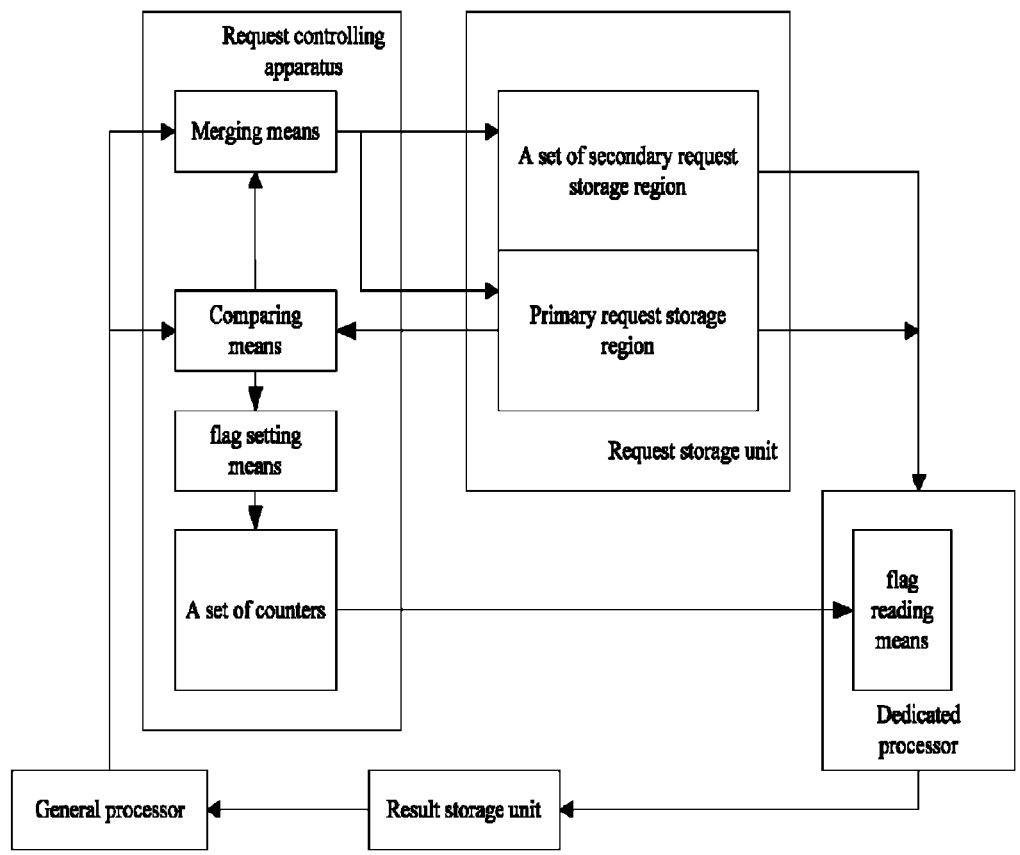
FIG. 7 illustrates a multiple processor cooperative architecture according to still another embodiment of the invention.

FIG. 7 shows a multiple processor cooperative architecture according to yet another embodiment of the invention.

In the architecture shown in FIG. 6A, the queue unit storing flag recording region is implemented with a bit that corresponds to respective queue unit one by one. In the architecture shown in FIG. 7, the queue unit storing flag recording region is implemented by a counter.

The counter is set to correspond to the secondary request storage region and is used for indicating the number of queue units in the respective secondary request storage region. In particular, when the secondary request storage region set for the third queue unit is empty, a value of the counter corresponding to the third queue unit is 0; whenever a queue unit enters the secondary request storage region set for the third queue unit, the value of counter corresponding to the third queue unit is increased by 1; whenever a queue unit in the secondary request storage region corresponding to the third queue unit is processed, the value of the counter corresponding to the third queue unit is reduced by 1.

Those skilled in the art can readily prescribe other way to set the value of the counter.

The counter corresponding to the third queue unit can use the signal output by the flag setting means when the first queue unit is the same as the third queue unit as a signal that can be increased by 1, itself. When the incoming first queue unit and the third queue unit correspond to a same message, as described above, the first queue unit enters the secondary request storage region corresponding to the third queue unit.

Accordingly, the flag setting means sends a signal of increasing by 1 to the counter corresponding to the third queue unit.

The dedicated processor judges whether the value of the counter is 0 by the flag reading means after the third queue unit is processed. There are various methods for judging whether the value of counter is 0, for example, it can be judged whether a result of "or" operation for each bit of counter is 0. If it is not 0, it indicates that a queue unit exists in the secondary request storage region corresponding to the third queue unit, such that the dedicated processor will not store the message state, and will continue to process a first queue unit, (which is referred to as the fifth queue unit hereafter), in the secondary request storage region corresponding to the third queue unit.

After the dedicated processor has processed the fifth queue unit, a signal of reducing by 1 is sent to the counter corresponding to the third queue unit. It is again judged by the flag reading means whether the value of counter is 0. If it is not 0, it indicates that queue unit still exists in the secondary request storage region corresponding to the third queue unit, such that the dedicated processor still will not store the message state, and will continue to process the second queue unit in the secondary request storage region corresponding to the third queue unit. And so on, until all queue units in the secondary request storage region corresponding to the third queue unit have been processed.

Implementing the queue unit storing flag recording region as the counter can reduce the number of bits required to indicate whether the message state needs to be stored for the queue unit in the secondary request storage region. For example, for the secondary request storage region that can house 16 queue units, if the bits that correspond to the queue units, one by one, are used to implement the queue unit storing flag recording region, then 16 bits will be needed; if a counter is used to implement the queue unit storing flag recording region, 4 bits are needed.

As for the embodiments shown in FIG. 6A and FIG. 7, referring to the primary request storage region and the secondary queue illustratively shown in FIG. 6B, if the queue unit corresponding to message C enters the first secondary request storage region in FIG. 6B continuously, then the queue units corresponding to message A and message B will never be processed.

To overcome this problem, a threshold means can be set in the request controlling apparatus for checking whether a number of queue units corresponding to a same message that are placed in a secondary request storage region successively exceeds a first threshold. If the first threshold is exceeded, even if the comparing means finds that the incoming first queue unit corresponds to a same message as a certain, already existing, queue unit in the primary request storage region or the secondary request storage region, the merging means still will place that first queue unit at queue end of the primary request storage region.

Assume that the first threshold is 3, then in FIG. 6B, even if another queue unit corresponding to message C comes, the merging means will not place it into the first secondary request storage region, and the flag setting means also will not perform a corresponding flag setting operation.

When the first queue unit comes, it is possible that the primary request storage region is not full, the third queue unit that corresponds to a same message as the first queue unit lies at queue end of the primary request storage region. In this case, the first queue unit can be placed into the secondary request storage region corresponding to elementary hardware storage unit where the third queue unit lies, or the first queue unit can be placed into the primary request storage region.

If the first queue unit is placed into the primary request storage region, access to external storage can be avoided when the first queue unit is placed into the secondary request storage region and when dedicated processor processes the first queue unit.

In addition, to set the secondary request storage region corresponding to the elementary hardware storage unit in the primary request storage region, additional secondary request storage region can also be set. As such, if the incoming first queue unit does not correspond to a same message as any queue unit in the primary request storage region for which the secondary request storage region is set, and the primary request storage region is in full state, the incoming queue unit can be placed into the additional secondary request storage region. More than two additional secondary request storage regions can be set; each maintains, therein, a queue unit corresponding to one message.

The additional secondary request storage region can also be set dynamically, such that the request controlling means further comprises an additional secondary request storage region setting means. If the incoming first queue unit does not correspond to a same message as any queue unit in the primary request storage region for which the secondary request storage region is set, and the primary request storage region is in full state, it is further judged whether the first queue unit corresponds to a same message as a certain queue unit for which the additional secondary request storage region is set.

If the first queue unit corresponds to a same message as a certain queue unit for which the additional secondary request storage region is set, the first queue unit is placed into the additional secondary request storage region that has been set, and storing flags corresponding to queue unit that enters the set additional secondary request storage region prior to the first queue unit is set to indicate that the message state will not be stored.

If the first queue unit does not correspond to a same message as any queue unit of the primary request storage region for which the secondary request storage region is set, neither does the first queue unit correspond to a same message as any queue unit in which the additional secondary request storage region is set, then a new additional secondary request storage region is set and the first queue unit is taken as the first queue unit of the newly set additional secondary request storage region.

As described above, the additional secondary request storage region lies in the external storage, thus in order to avoid accessing external storage when it is judged whether the first queue unit corresponds to a same message as the queue unit in the additional secondary request storage region, a queue unit message ID recording region is further set for respective additional secondary request storage region in the request controlling apparatus. Similarly, in order to avoid accessing external storage when the storing flag corresponding to the queue unit is modified, the storing flag is stored by the queue unit storing flag recording region in the request controlling apparatus. Since the additional secondary request storage region is set dynamically, the number of queue units that can be housed in it can also be implemented by a counter in the queue unit storing flag recording region, rather than by bit corresponding to respective queue unit.

The request controlling method for controlling a request storage unit consisting of the primary request storage region and the secondary request storage region according to an embodiment of the invention comprises: recording, in a queue unit storing flag recording region, the storing flag corresponding to the queue unit in the request storage unit; judging whether the first incoming queue unit corresponds to the same message as the queue unit that already exists in the request storage unit; and setting the storing flag corresponding to the queue unit that already exists in the request storage unit in the queue unit storing flag recording region to indicate that the message state related to that queue unit will not be stored, if the first queue unit corresponds to the same message as the queue unit that already exists in the request storage unit.

The preferred embodiments of the invention are described above with reference to the architectures of the general processor and the dedicated processor. In such architectures, the dedicated processor is used as a co-processor, and it performs certain data process and sends the result of the processing to the general processor under the request of the general processor used as the main processor.

Those skilled in the art can appreciate that the invention is applicable to other architectures. For example, at least two processors in the architecture are all general processors; in which at least one processor is the main processor, and at least the other processor is the co-processor. In such architecture, the main processor and the co-processor are relative, and can even be interchanged. Thus, the request storage unit should be construed as a unit which a party storing the state uses to receive data. Those skilled in the art can also appreciate that, the main processor and the co-processor can be different processor chips, or can be different units in a same chip.

Those skilled in the art can appreciate that, the above method and system can be implemented by using computer executable instructions and/or control codes contained in processor, for example, such codes are provided on carrier medium such as magnetic disk, CD or DVD-ROM, programmable memory such as read-only memory (firmware) or data carrier such as a optical or electrical signal carrier. The system and its component of the embodiment for controlling energy consumption of a mobile device can be implemented by a hardware circuit such as a very large scale integrated circuit or gate array, semiconductor, logic chip, transistor etc, or programmable hardware device such as field programmable gate array, programmable logic device etc, or by software executed by various types of processors, or by a combination of the above hardware circuit and software such as firmware.

Although several exemplary embodiments of the invention are illustrated and described, those skilled in the art will understand that, changes can be made to these embodiments without departing from the spirit and scope of the invention. The scope of the invention is defined by the appended claims and their equivalent transformations.

What is claimed is:

1. A computer implemented request controlling method for controlling a request storage unit comprising a primary request storage region and a secondary request storage region, the method comprising:

recording, in a queue unit storing flag recording region, a storing flag corresponding to a queue unit in the request storage unit;

judging whether an incoming first queue unit corresponds to a same message as an already existing queue unit in the request storage unit;

setting the storing flag corresponding to the already existing queue in the queue unit storing flag recording region, to thereby indicate that a message state related to the already existing queue will not be stored, if the first queue unit corresponds to a same message as the already existing queue unit;

merging the first queue unit into an additional secondary request storage region corresponding to the already existing queue unit if the first queue unit corresponds to a same message as the already existing queue unit, wherein the additional secondary request storage region is disposed in a storage that is external to a processor comprising the primary storage, wherein the first queue unit is the first queue unit of the additional secondary request storage region if the first queue unit corresponds to a different message from the already existing queue unit and the request storage region is full;

judging whether the first queue unit corresponds to a same message as a certain queue unit for which the additional secondary request storage region is set if the incoming first queue unit does not correspond to a same message as any queue unit in the primary request storage region for which the secondary storage request region is set and the primary request region is in full state;

merging the first queue into the additional secondary request storage region is the first queue unit corresponds to a same message for which the additional secondary request storage region is set;

wherein at least one step is carried out using a computer device.

2. The request method according to claim 1, wherein the judging further judges whether the first queue unit corresponds to a same message as a second queue unit at the end of the request storage unit.

3. The method according to claim 1, wherein the secondary request storage region and additional secondary request region are set in a manner corresponding to at least one elementary hardware storage unit of the primary request storage region.

4. A non-transitory, computer readable storage medium tangibly embodying a computer readable program code having computer readable instructions which, when implemented, cause a computer to carry out the method according to claim 1.

5. The request method according to claim 1, the method further comprising:

setting the storing flag corresponding to the certain queue unit that enters the set additional secondary request storage region prior to the first queue unit, to thereby indicate that a message state related that the message will not be stored;

setting a new additional secondary request storage region if the first queue unit does not correspond to a same message as any queue unit of the primary request storage region for which the secondary request storage region is set, neither does the first queue unit correspond to a same message as any queue unit in which the additional secondary request storage region is set and the first queue unit is taken as the first queue unit of the newly set additional secondary request storage region.

* * * * *